United States Patent
Mansour (10) Patent No.: US 11,568,135 B1
(45) Date of Patent: Jan. 31, 2023

(54) IDENTIFYING CHAT CORRECTION PAIRS FOR TRAINING MODELS TO AUTOMATICALLY CORRECT CHAT INPUTS

(71) Applicant: Amazon Technologies, Inc., Seattle, WA (US)

(72) Inventor: Saab Mansour, San Jose, CA (US)

(73) Assignee: Amazon Technologies, Inc., Seattle, WA (US)

(\*) Notice: Subject to any disclaimer, the term of this patent is extended or adjusted under 35 U.S.C. 154(b) by 206 days.

(21) Appl. No.: 17/030,204

(22) Filed: Sep. 23, 2020

(51) Int. Cl.
*G06F 40/232* (2020.01)
*G06Q 50/00* (2012.01)
*G06Q 30/06* (2012.01)
*G06N 20/00* (2019.01)
*G06N 5/04* (2006.01)
*H04L 51/212* (2022.01)

(52) U.S. Cl.
CPC ............ *G06F 40/232* (2020.01); *G06N 5/04* (2013.01); *G06N 20/00* (2019.01); *G06Q 30/0623* (2013.01); *G06Q 30/0633* (2013.01); *G06Q 50/01* (2013.01); *H04L 51/212* (2022.05)

(58) Field of Classification Search
CPC ........ G06F 40/232; G06N 5/04; G06N 20/00; G06Q 30/0623; G06Q 30/0633; G06Q 50/01; H04L 51/212
See application file for complete search history.

(56) References Cited

U.S. PATENT DOCUMENTS

| | | | |
|---|---|---|---|
| 9,218,333 B2 | 12/2015 | Liensberger | |
| 9,697,194 B2 | 7/2017 | Eberbach | |
| 10,388,272 B1* | 8/2019 | Thomson | G10L 15/22 |
| 10,594,757 B1* | 3/2020 | Shevchenko | H04L 67/306 |
| 10,614,800 B1* | 4/2020 | McMahon | G06F 3/0481 |
| 10,909,973 B2* | 2/2021 | Stephenson | G10L 15/1822 |
| 2005/0105712 A1* | 5/2005 | Williams | G10L 13/027 704/275 |
| 2007/0038436 A1* | 2/2007 | Cristo | G10L 15/22 704/E15.04 |
| 2007/0299664 A1* | 12/2007 | Peters | G06F 40/16 704/235 |
| 2008/0154828 A1* | 6/2008 | Antebi | G06N 5/022 707/999.005 |
| 2009/0012789 A1* | 1/2009 | Gaudet | G06F 40/274 704/251 |
| 2009/0228273 A1* | 9/2009 | Wang | G10L 15/22 704/235 |

(Continued)

*Primary Examiner* — Javier O Guzman
(74) *Attorney, Agent, or Firm* — Robert C. Kowert; Kowert, Hood, Munyon, Rankin & Goetzel, P.C.

(57) ABSTRACT

A chat input identifier may receive various chat inputs based on voice or text inputs from a user. The chat input identifier may apply different filters to the chat inputs to identify one or more chat correction pairs (e.g., chat input with errors, corrected chat input) from among the plurality of chat inputs. The chat correction pairs are used to train an auto-correction model. The trained auto-correction model receives a given chat input that has one or more errors. The auto-correction model processes the given chat input to generate a corrected version of the given chat input (without the need to obtain a correction from the user). The corrected chat input is then provided to a dialog-driven application.

20 Claims, 8 Drawing Sheets

(56) References Cited

U.S. PATENT DOCUMENTS

| | | | | |
|---|---|---|---|---|
| 2014/0067371 A1* | 3/2014 | Liensberger | ......... | G06F 40/242 |
| | | | | 704/9 |
| 2018/0233132 A1* | 8/2018 | Herold | ................ | H04N 21/231 |
| 2018/0367480 A1* | 12/2018 | Housman | .............. | G06F 40/247 |
| 2019/0073998 A1* | 3/2019 | Leblang | ................ | G10L 15/22 |
| 2019/0213996 A1* | 7/2019 | Aaron | ................... | G10L 15/063 |
| 2019/0348038 A1* | 11/2019 | Hori | ....................... | G06F 40/56 |
| 2020/0050534 A1* | 2/2020 | Sze | ...................... | G06F 11/277 |
| 2020/0379725 A1* | 12/2020 | Dhillon | ................ | G06F 40/284 |
| 2021/0027766 A1* | 1/2021 | Shi | ....................... | G10L 15/063 |
| 2021/0050001 A1* | 2/2021 | Chen | ..................... | G09B 19/04 |
| 2021/0081423 A1* | 3/2021 | Specter | ................ | G06F 40/279 |
| 2021/0375291 A1* | 12/2021 | Zeng | .................... | G06F 16/535 |

\* cited by examiner

IDENTIFYING CHAT CORRECTION PAIRS FOR TRAINING MODELS TO AUTOMATICALLY CORRECT CHAT INPUTS

BACKGROUND

Chat-based software applications are becoming more widely used across various industries. For example, many websites provide a text-based user interface that allows a user to type a question about a product, submit the question, and receive an answer that is automatically generated in the back end by a dialog-driven application. Some chat-based applications may allow a user ask questions by simply speaking. In that case, speech recognition software may convert spoken words into text, which is then submitted to a dialog-driven application for processing.

Although the use of chat-based software applications provides a convenient way for users to quickly obtain answers to various questions, errors in the chat input may prevent an application from interpreting a question provided by a user. For example, if a question submitted via a text-based user interface has a typo or if there are speech recognition errors, then the dialog-driven application may not understand what the user is asking for. The user may need to repeat the question one or more times in order for the dialog-driven application to properly interpret the question, which may cause user frustration and a longer response time to provide an answer.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to identify chat correction pairs for training models to automatically correct chat inputs, according to some embodiments. In embodiments, using such models (referred to herein as "auto-correction" models) may reduce the amount of time and effort required for a user to use a dialog-driven application, compared to other techniques. For example, if textual input from a user includes typos, an auto-correction model may automatically generate a corrected version of the textual input (without asking the user to provide a correction/re-enter input) and provide the corrected textual input to the dialog-driven application. By using auto-correction models, fewer computing resources and communication resources may be needed in order to obtain information from a user and perform various functions for the user.

In some embodiments, a dialog-driven application may refer to an application that accepts language-based input from an end user of the application (e.g., text input or voice/audio), in order to perform a particular task or function. For example, the application may process the language-based input (e.g., using natural language understanding (NLU) models/components) to determine a particular task from a variety of different available tasks to perform for the user. In embodiments, "chat input" may refer to text (e.g., any number of characters and/or words) that is the result of text input received from a user and/or text that is the result of the application of a speech recognition algorithm(s) to speech input received from a user.

In embodiments, a model (e.g., an auto-correction model) may be any suitable type of model and/or processing logic (e.g., neural network, etc.) that accepts chat input, processes/analyzes the chat input, and generates a corrected version of the chat input if the chat input includes one or more errors (e.g., typos). In embodiments, any number of chat correction pairs (e.g., input with errors, corrected input) may be used as training data to train an auto-correction model to correct chat inputs that include one or more errors and/or to not change chat inputs that do not includes any errors. In embodiments, a trained auto-correction model may identify and correct any number of errors that are present in a given chat input.

After an auto-correction model has been trained using chat correction pairs, it may then be made available for use (e.g., deployed to a production environment for use with a dialog-driven application to process/correct input from users). In embodiments, an auto-correction model may be re-trained (e.g., updated) any number of times using any number of additional identified chat correction pairs as described above (e.g., based on obtaining additional chat inputs and identifying the additional chat correction pairs). The updated auto-correction model to be available to process additional chat inputs (e.g., deployed/sent to the destination).

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 8 and described below.

This specification begins with a description of a system for identifying chat correction pairs for training models to automatically correct chat inputs. A number of different methods and techniques to identify chat correction pairs for training models to automatically correct chat inputs are discussed, some of which are illustrated in accompanying flowcharts. Finally, a description of an example computing system upon which the various components, modules, systems, and/or techniques described herein may be implemented is provided. Various examples are provided throughout the specification.

Figure 1:
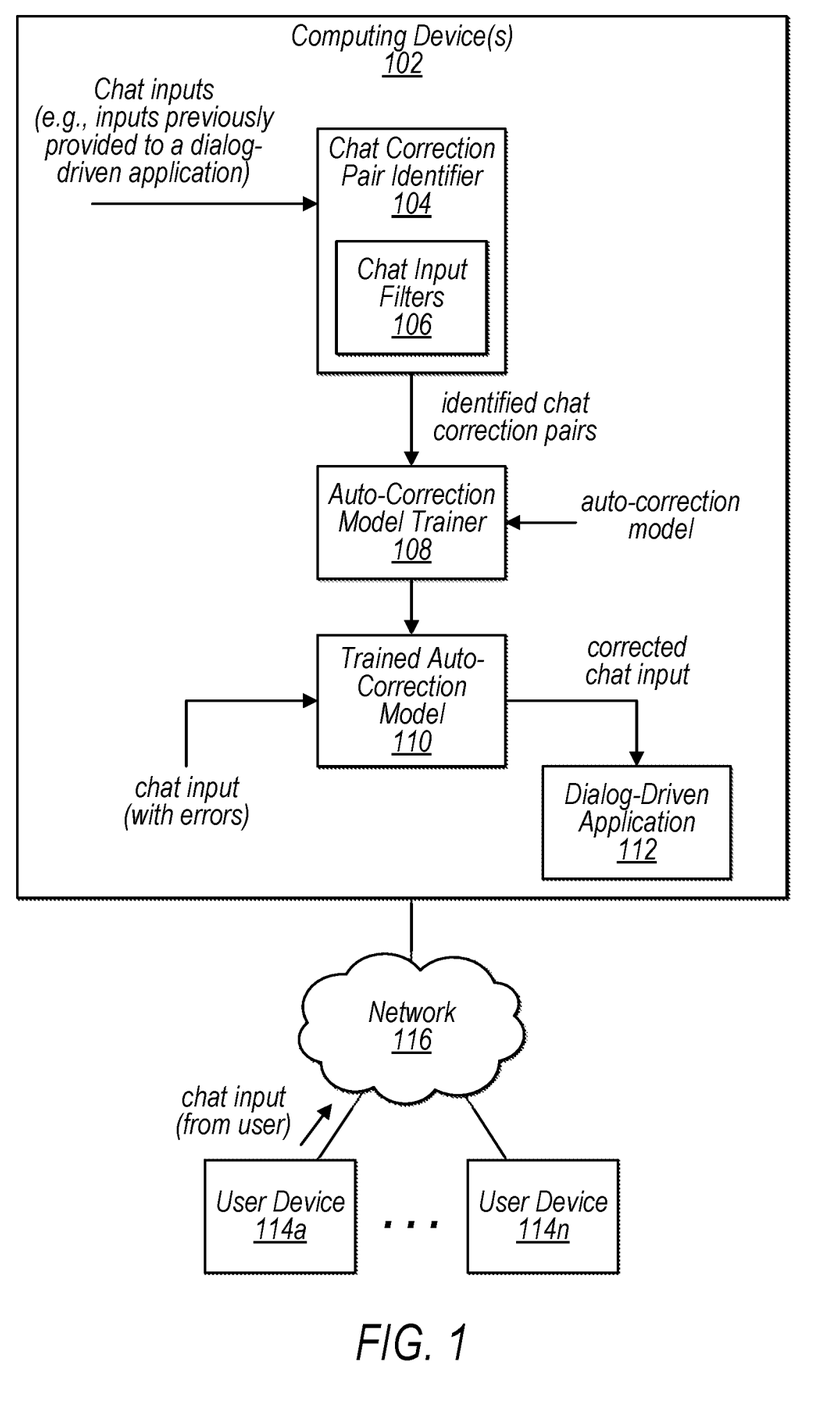
FIG. 1 is a logical block diagram illustrating a system for identifying chat correction pairs for training models to automatically correct chat inputs, according to some embodiments.

FIG. 1 is a logical block diagram illustrating a system for identifying chat correction pairs for training models to automatically correct chat inputs, according to some embodiments.

In the depicted embodiment, one or more computing devices 102 implement a chat correction pair identifier 104 that has any number of chat input filters 106, an auto-correction model trainer 108, a trained auto-correction model 110, and a dialog-driven application 112. In various embodiments, any number of different computing devices may each implement different one(s) of the above components.

As shown, any number of user devices 114 may send and receive data to and from the computing device(s) 102 via a network 116. In embodiments, the network 116 may be any type of local area network and/or wide area network (e.g., the internet) that allows the user devices to communicate with the computing device(s) 102. In some embodiments, the computing device(s) 102 may include one or more of the user devices (e.g., a computer/server that implements one or more of the above components).

In embodiments, the chat correction pair identifier 104 may obtain any number of chat inputs and identify (e.g., using one or more chat input filters 106) any number of chat correction pairs from among the chat inputs (e.g., chat input with errors, corrected chat input). A given chat correction pair may be based on two respective inputs from a particular user (e.g., based on text input or speech recognition). One of the chat inputs may have one or more errors (e.g., typos) and the other chat input may be a corrected version of the chat input. For example, the chat input may be "Order to buckets" and the other corrected chat input may be "Order two buckets."

In various embodiments, the chat input and the other chat input may represent chat inputs that were previously provided to a dialog-driven application (e.g., the dialog-driven application 112). For example, after the application received the chat input with error(s), the application received the other chat input as the corrected version of the chat input. In some embodiments, the user may have provided the corrected input after realizing that the initial chat input provided to the application had one or more errors that prevented the application (e.g., NLU components of the application) from properly interpreting the initial chat input.

In an embodiment, the chat inputs may be a series of chat inputs that are processed by a dialog-driven application over a period of time. The series of chat inputs may be based on input from one or more particular users. When the chat inputs are based on inputs from more than one user, metadata may identify which user each of the chat inputs belongs to. For example, one user may have provided a series of inputs to purchase two buckets using a retail application and another user may have provided another series of inputs to purchase two brooms using the same retail application. In the depicted embodiment, the chat correction pair identifier 104 may use the metadata to identify which user each of the chat inputs belongs to (e.g., which user provided the input (whether text or speech) that resulted in the chat input that was provided to the application).

In embodiments, the chat correction pair identifier sends the one or more identified chat correction pairs to the auto-correction model trainer. The auto-correction model trainer may then train an auto-correction model using the one or more identified chat correction pairs to receive chat inputs and to correct them (if they include one or more identified errors). The computing device(s) may cause the auto-correction model to be available to process other chat inputs (e.g., available for use by the dialog-driven application 112). In some embodiments, the auto-correction model may be deployed/transmitted to a destination so that is available for use with the application (e.g., if the application is installed at another computing device(s) of the local network or a remote/client network).

As shown, the trained auto-correction model 110 may receive chat input that is based on input from a user (via user device 114*a*) of the dialog-driven application 112 and includes one or more errors. The trained auto-correction model 110 may then process the chat input to generate a corrected version of the chat input.

In some embodiments, the trained auto-correction model does not make any changes/corrections to the chat input and outputs the same chat input that it received. For example, the trained auto-correction model may include a component that determines whether a given chat input is noisy (e.g., has errors or is likely to have errors). If so, then the component causes the trained auto-correction model to process the chat input and either generates the corrected chat input or makes no changes (based on the processing). However, if the component determines the given chat input is not noisy (e.g., has no errors or is not likely to have errors), then the component may pass the chat input through (e.g., without using the trained portion of the auto-correction model to process the chat input). Note that in some embodiments, the component may be separate from the auto-correction model and determines whether or not to send the chat input to the trained auto-correction model (depending on whether the chat input has errors or is likely to have errors).

As shown, the trained auto-correction model (or another component implemented by the computing device) may then send the corrected chat input to the dialog-driven application 112 (or another destination such as a dialog-driven application at another computing device and/or remote network) for processing. In embodiments, the dialog-driven application 112 may use NLU components to interpret the corrected chat input. Based on the interpretation, the dialog-driven application 112 may perform one or more tasks (e.g., creating an order to ship items to an address), generate a response (e.g., a message or result of the tasks), and/or send the response to the user that initially provided the input for the dialog-driven application 112.

In embodiments, the trained auto-correction model may process a given chat input from a user without modifying it (e.g., the output of the model will be the same as the given chat input that it received). This may occur when the trained auto-correction model does not identify any errors.

In some embodiments, the trained auto-correction model assigns a confidence level to the corrected version of the chat input. The model or the computing device 102 may determine whether the confidence level of the corrected chat input is above a predetermined threshold level (e.g., a numerical threshold for a confidence score). If so, then the trained auto-correction model (or another component implemented by the computing device) may then send the corrected chat input to the dialog-driven application 112 (or another destination such as a dialog-driven application at another computing device and/or remote network) for processing. If not, then the trained auto-correction model (or another component implemented by the computing device) may instead send the unprocessed chat input itself (instead of the corrected chat input processed by the model).

Figure 2A:
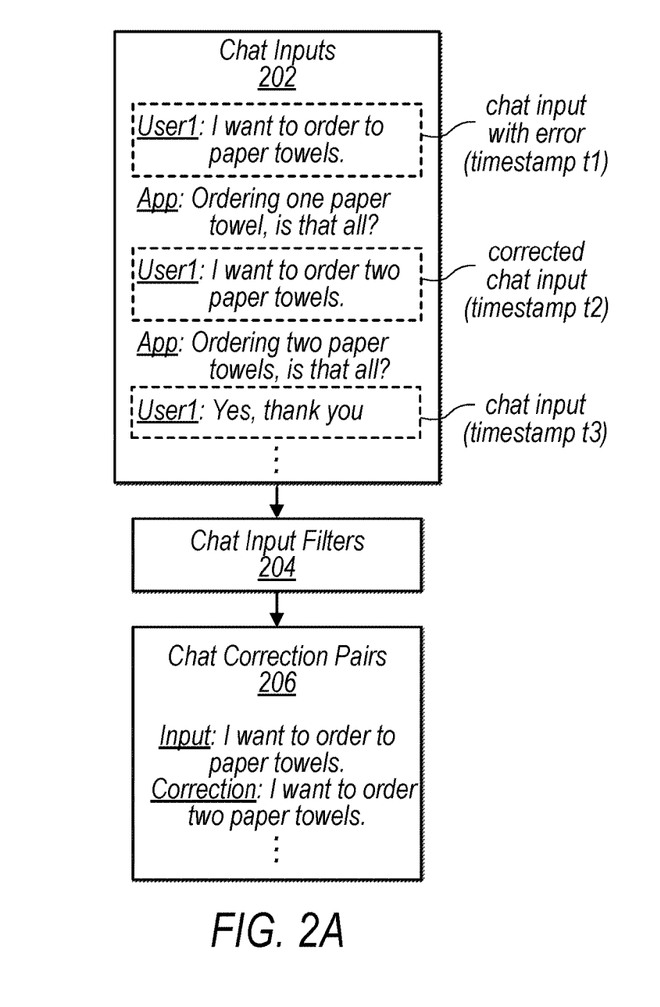
FIG. 2A is a logical block diagram illustrating applying filters to chat inputs to identify chat correction pairs, according to some embodiments.

FIG. 2A is a logical block diagram illustrating applying filters to chat inputs to identify chat correction pairs, according to some embodiments.

The depicted embodiment shows a log that includes chat inputs 202 provided to a dialogue-driven application. The chat inputs are text inputs that are based on inputs from a user (identified with the metadata "User1"). The inputs from the user may be the result of text inputs from the user or speech recognition of speech (e.g., phrases or utterances) from the user. As shown, the log also includes chat outputs provided from the dialogue-driven application. In embodiments, the chat outputs represent textual output from the application and/or audio output from the application. In some embodiments, the log includes the chat inputs but not the chat outputs.

As shown, each of the chat inputs includes a timestamp (or is otherwise associated with a timestamp). The timestamp for a given chat input may indicate a time or approximate time that the given chat input was provided to the application. As shown, the first chat input from User1 has a timestamp "t1," the second chat input from User1 has a timestamp "t2," and the third chat input from User1 has a timestamp "t3." In embodiments, the chat inputs 202 may include any number of additional chat inputs from User1 with corresponding timestamps. In various embodiments, the chat inputs 202 may also include any number of other chat inputs (with associated timestamps and user identifiers) from any number of other users.

In the depicted embodiment, the chat input filters 204 are applied to the chat inputs 202 to identify one or more chat correction pairs 206 from among the chat inputs 202. Any number of filters may be applied to identify the chat correction pairs 206. As shown, one of the identified chat correction pairs is the first input "I want to order to paper towels" from User1 with timestamp "t1" and the second input "I want to order two paper towels" from User1 with timestamp "t2."

In embodiments, the chat input filters 204 may apply the filters to identify any number of additional chat correction pairs from the same user and/or any number of other users. For example, another chat correction pair correction pair may be identified for a user of the same dialog-driven application, identified as "User2." FIGS. 3 and 4 describe some examples of filters that may be applied to identify chat correction pairs.

Figure 2B:
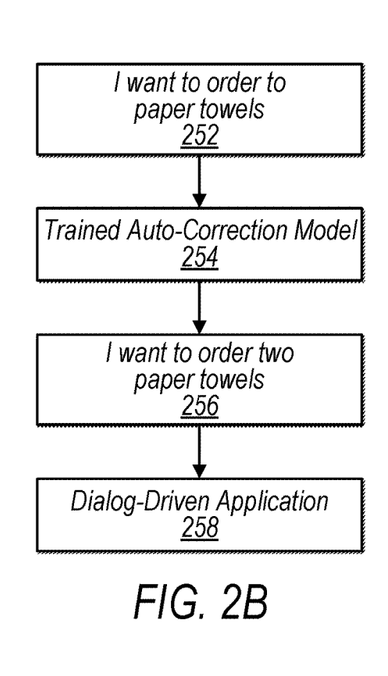
FIG. 2B is a logical block diagram illustrating the processing of a chat input by a trained auto-correction model to generate a corrected version of the chat input, according to some embodiments.

FIG. 2B is a logical block diagram illustrating the processing of a chat input by a trained auto-correction model to generate a corrected version of the chat input, according to some embodiments.

As depicted, chat input 252 is provided to a trained auto-correction model 254. The trained auto-correction model 254 may be trained based at least on the chat inputs 202 of FIG. 2A. The chat input is based on input from User A (e.g., text input provided by User A or text input based on speech recognition of User A's speech) and has one or more errors (e.g., typos/spelling errors, grammatical errors, or any other type of language-related error). In this case, the chat input has a typo ("to" instead of "two). As shown, the trained auto-correction model 254 receives the chat input and processing the chat input to generate a corrected version of the given chat input 256 ("I want to order two paper towels"). The corrected version of the given chat input may then be sent to the dialog-driven application 258. By automatically correcting the chat input without the need to obtain any additional correction from User A, the trained auto-correction model 254 allows the dialog-driven application perform tasks for the user faster than using traditional techniques (e.g., asking the user for additional input). Note that in embodiments, User A may be any user of the dialog-driven application 258 (e.g., one of the users that provided one or more of the chat inputs 202 or any other user).

Note that in various embodiments, the trained auto-correction model 254 may leverage aspects of models/machine learning to automatically generate a corrected version of a given chat input even though it has not been trained with a chat correction pair that includes the given chat input or the corrected version of the given chat input. In other words, in various embodiments the trained auto-correction model may be used to correct a large variety of chat inputs even though it was trained with a much smaller number of chat inputs. For example, the trained auto-correction model 254 may receive a chat input of "send to coffee cups" and generate the corrected version "send two coffee cups," even though the model was not trained with those specific chat correction pairs.

Figure 3:
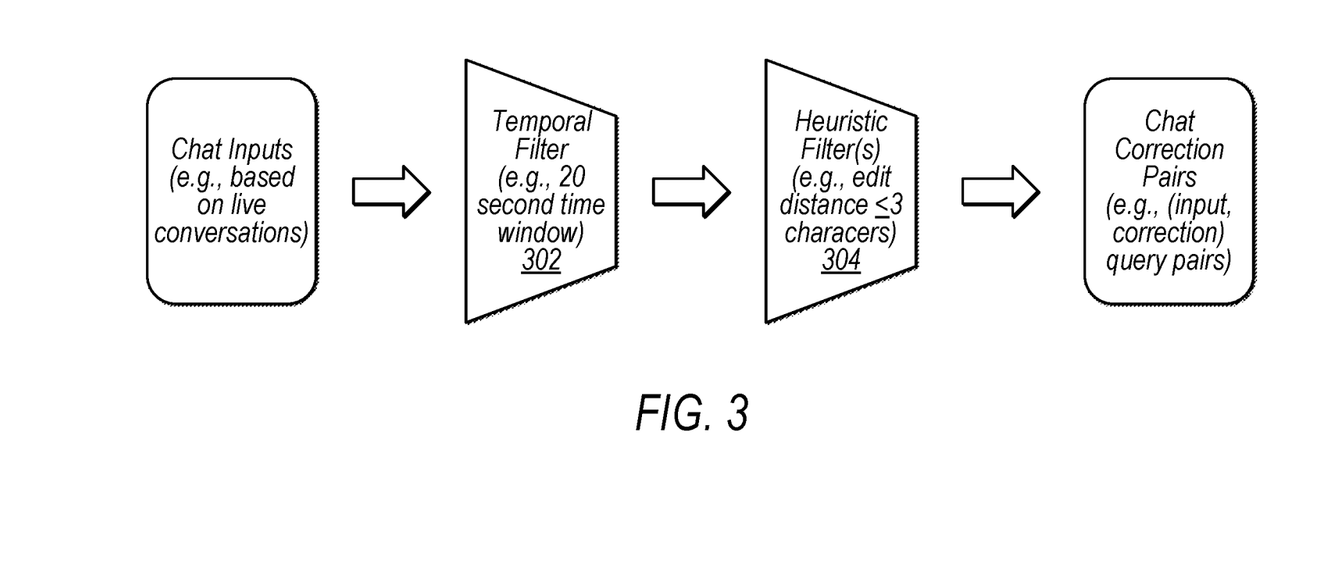
FIG. 3 is a logical block diagram illustrating applying temporal and heuristic filters to chat inputs to identify chat correction pairs, according to some embodiments.

FIG. 3 is a logical block diagram illustrating applying temporal and heuristic filters to chat inputs to identify chat correction pairs, according to some embodiments.

In embodiments, any number of multiple chat inputs may be provided to a chat correction pair identifier. The chat inputs may be based on live conversations (e.g., text-based or speech-based conversations between users and a dialog-driven application). A chat correction pair identifier may apply filter(s) to some or all of the chat inputs.

In the depicted embodiment, the chat correction pair identifier applies a temporal filter 302 to the chat inputs to determine that a time that corresponds to one of the chat inputs is within a time window of another time that corresponds to another chat input. For example, the correction pair identifier may apply the temporal filter 302 to the chat inputs 202 of FIG. 2A to determine that a time indicated by "timestamp t2" of the second chat input is within a predetermined threshold time window (e.g., within 20 seconds) of another time indicated by "timestamp t1" of the first chat input.

After determining that the two timestamps are within the predetermined threshold time window, the correction pair identifier may apply one or more heuristic filters 304 to determine whether the second chat input is a corrected version of the first chat input. For example, the correction pair identifier may apply a similarity filter to determine if the second chat input is within a predetermined threshold of similarity of the first chat input. For example, the predetermined threshold of similarity of may be an edit distance of three characters. If the second chat input can match the first chat input by changing, adding, or deleting three characters or less, then the chat correction pair identifier may determine that the second chat input is within the threshold of similarity to the first chat input (e.g., changing "to" to "two" indicates an edit distance of one). In response, the chat correction pair identifier may identify the first chat input and the second chat input as a chat correction pair (e.g., input with errors, corrected input). In embodiments, the edit distance between chat input A and chat input B may be any number of characters and/or any number of words that must be changed, added, or deleted for chat input B so that chat input B matches chat input A (or vice versa).

As described above, the first chat input and the second chat input of FIG. 2A passes both the temporal filter and the heuristic filter. In response, the chat correction pair identifier may identify the first chat input and the second chat input as a chat correction pair. Some chat inputs may not pass the filters and therefore will not be identified as a chat correction pair.

In an embodiment, the second chat input and the third chat input of FIG. 2A may fail the temporal filter or the heuristic filter and in response, the chat correction pair identifier may not identify them as a chat correction pair. For example, if the correction pair identifier applies the temporal filter 302 to the chat inputs 202 of FIG. 2A to determine that a time indicated by "timestamp t3" of the third chat input is not within the pre-determined threshold time window (e.g., within 20 seconds) of another time indicated by "timestamp t2" of the second chat input, then the correction pair identifier may determine that they are not a chat correction pair. In this case, the heuristic filter is not needed.

Figure 4:
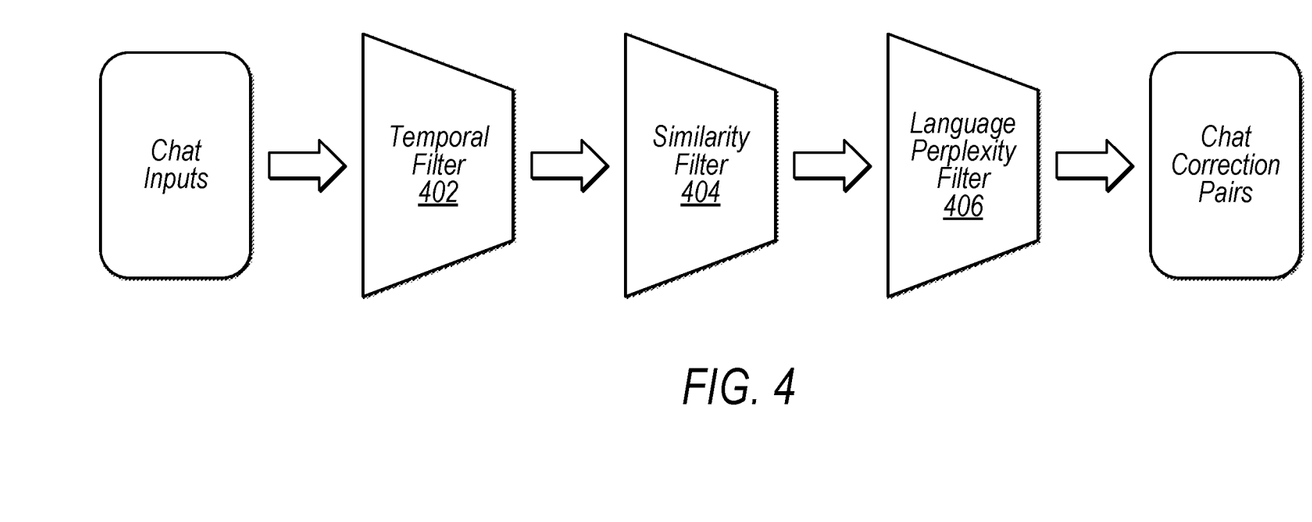
FIG. 4 is a logical block diagram illustrating applying temporal, similarity, and language perplexity filters to chat inputs to identify chat correction pairs, according to some embodiments.

If the time indicated by "timestamp t3" of the third chat input is within the pre-determined threshold time window (e.g., within 20 seconds) of another time indicated by "timestamp t2" of the second chat input, then the correction pair identifier may then apply the heuristic filter to the two chat inputs. However, the chat input "I want to order two paper towels" is not within an edit distance of three characters of "Yes, thank you." In response, the chat correction pair identifier may not identify the second and third chat inputs as a chat correction pair. FIG. 4 describes an example of a chat correction pair identifier that uses two heuristic filters (a similarity filter and a language perplexity filter).

FIG. 4 is a logical block diagram illustrating applying temporal, similarity, and language perplexity filters to chat inputs to identify chat correction pairs, according to some embodiments.

In the depicted embodiment, the chat correction pair identifier applies a temporal filter 402, a similarity filter 404, and a language perplexity filter 406 to identify chat correction pairs from among chat inputs. In the depicted embodiment, the temporal filter 402 and the similarity filter 404 may operate in the same or similar manner as the temporal filter 302 and the heuristic filter 304 of FIG. 3, respectively. For example, the similarity filter 404 may perform any suitable algorithm to determine whether one chat input is within a threshold of similarity to another chat input.

Referring to FIG. 2A, the first chat input (with timestamp t1) and the second chat input (with timestamp t2) may pass both the temporal filter 402 and the similarity filter 404 (e.g., as described for FIG. 3). In the depicted example, the chat correction pair identifier then applies a language perplexity filter to the first chat input and the second chat input.

In embodiments, the chat correction pair identifier may apply the perplexity filter to determine whether a language perplexity of the second chat input is lower than a language perplexity of the first chat input. If so, then the chat correction pair identifier may determine that the first chat input and the second chat input passed the perplexity filter and identify the first chat input and the second chat input as a chat correction pair. If not, then the chat correction pair identifier may determine that the first chat input and the second chat input did not pass the perplexity filter and does not identify the first chat input and the second chat input as a chat correction pair.

In embodiments, the perplexity filter calculates a perplexity score for the first chat input and the second chat input in order for the chat correction pair identifier (or filter) to compare the language perplexity of the first chat input to the second chat input.

In an embodiment, a lower perplexity (e.g., lower perplexity score) for the second chat input indicates a relatively higher probability that the second chat input is well-formed (according to a language model) and/or has fewer errors, whereas a higher perplexity (e.g., higher perplexity score) for the first chat input indicates a relatively lower probability that the first chat input is well-formed (according to a language model) and/or has fewer errors. Therefore, the perplexity filter may assign to the second chat input ("I want to order two paper towels") a lower perplexity score (e.g., higher probability of correctness) than the first chat input ("I want to order to paper towels").

Figure 5:
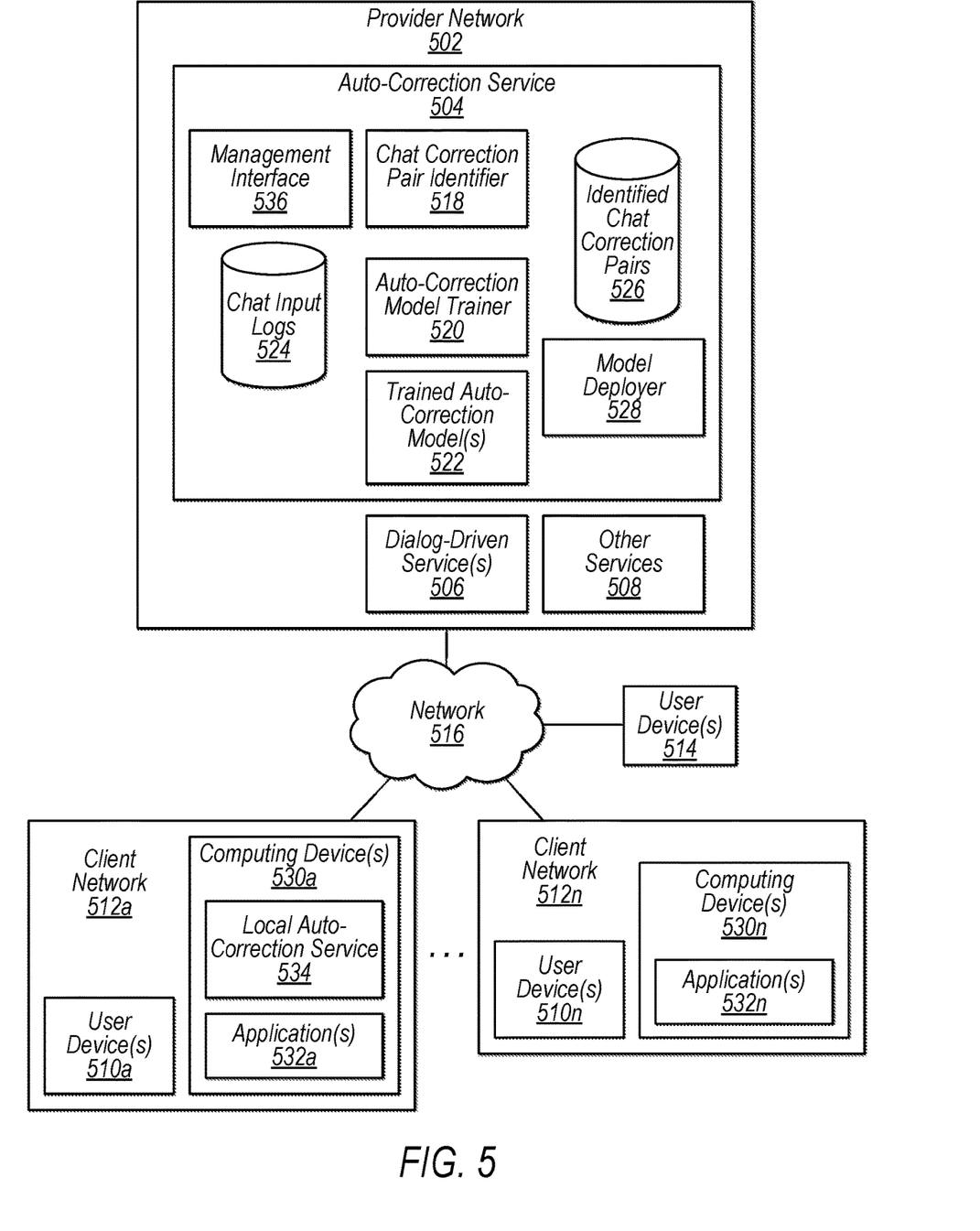
FIG. 5 is a logical block diagram illustrating a system for identifying chat correction pairs for training models to automatically correct chat inputs, according to some embodiments.

FIG. 5 is a logical block diagram illustrating a system for identifying chat correction pairs for training models to automatically correct chat inputs, according to some embodiments.

As shown, a provider network 502 may include an auto-correction service 504 and any number of dialog-driven services 506 and/or other services 508. As shown, any number of users may use a corresponding user device 510 of a remote client network 512 to use any of the dialog-driven services 506. Similarly, any number of users may use a corresponding stand-alone user device 514 (e.g., smart phone) to use any of the dialog-driven services 506. As depicted, devices of the client networks may communicate with the services of the provider network using a wide-area network 516 (e.g., the internet).

The auto-correction service 504 may include a chat correction pair identifier 518, an auto-correction model trainer 520, and trained auto-correction model(s) 522 that perform in the same or similar way for users of the user devices 510, 514 as the chat correction pair identifier 104, the auto-correction model trainer 108, and the trained auto-correction models 110 of FIG. 1 perform for users of the user devices 114. Similar to FIG. 1, the auto-correction service 504 may provide corrected chat inputs to one or more dialog-driven services 506 or other services 508. In some embodiments, one or more of the dialog-driven applications may be implemented by the provider network on behalf of a remote client (e.g., a client that that owns/manages a remote client network 512). As depicted, the auto-correction service 504 also includes chat input logs 524 that may store, for at least a temporary period of time, any number of chat inputs before they are provided to the chat correction pair identifier 518 for identification of chat correction pairs.

The auto-correction service 504 also includes any number of identified chat correction pairs 526 that may be stored, for at least a temporary period of time, before they are provided to the auto-correction model trainer 108 for training one or more auto-correction models to process chat inputs to generate a corrected version of the chat inputs. The auto-correction service 504 also includes model deployer 528, which may send trained auto-correction models to one or more destinations for use at those destinations to automatically correct chat inputs. For example, the model deployer 528 may send a trained auto-correction model to the computing device 530*n* of the client network 512*n* to automatically correct chat inputs that are provided to one or more dialog-driven applications 532*n*.

In embodiments, some or all of the components/functionality of the auto-correction service 504 may be implemented as a local auto-correction service on computing device(s) of a client network. For example, the local auto-correction service 534 may be implemented on computing device(s) 530*a* of the client network 512. In the depicted embodiment, the local service may automatically correct chat inputs and provide them to local dialog-based applications 532*a*.

As depicted, the auto-correction service 504 includes a management interface 536. In embodiments, an administrator at a client network may access the management interface (e.g., via application programming interface (API) and/or a computing device 530) to configure various aspects of the auto-correction service 504. For example, an administrator may provide one or more parameter values to assign values for one or more of the filters of the chat-correction pair identifier (e.g., the size of the predetermined threshold time window or the predetermined threshold of similarity (edit distance)). In embodiments, the administrator may assign the value for the predetermined threshold level for the confidence score. As another example, the administrator may provide any number of identified chat correction pairs to be used as training data for the auto-correction trainer.

Figure 6:
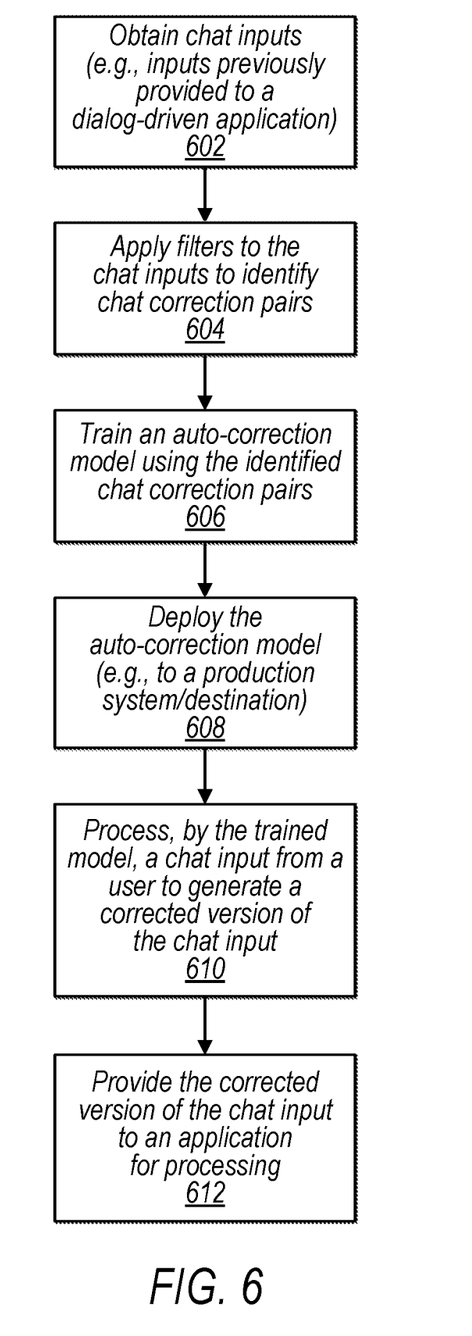
FIG. 6 is a high-level flowchart illustrating various methods and techniques to implement identifying chat correction pairs for training models to automatically correct chat inputs, according to some embodiments.

FIG. 6 is a high-level flowchart illustrating various methods and techniques to implement identifying chat correction pairs for training models to automatically correct chat inputs, according to some embodiments. In various embodiments, any of the functionality described for any portions of the flowcharts 6 and 7 may be performed by any of the components of FIGS. 1-5 and/or 8.

Figure 7:
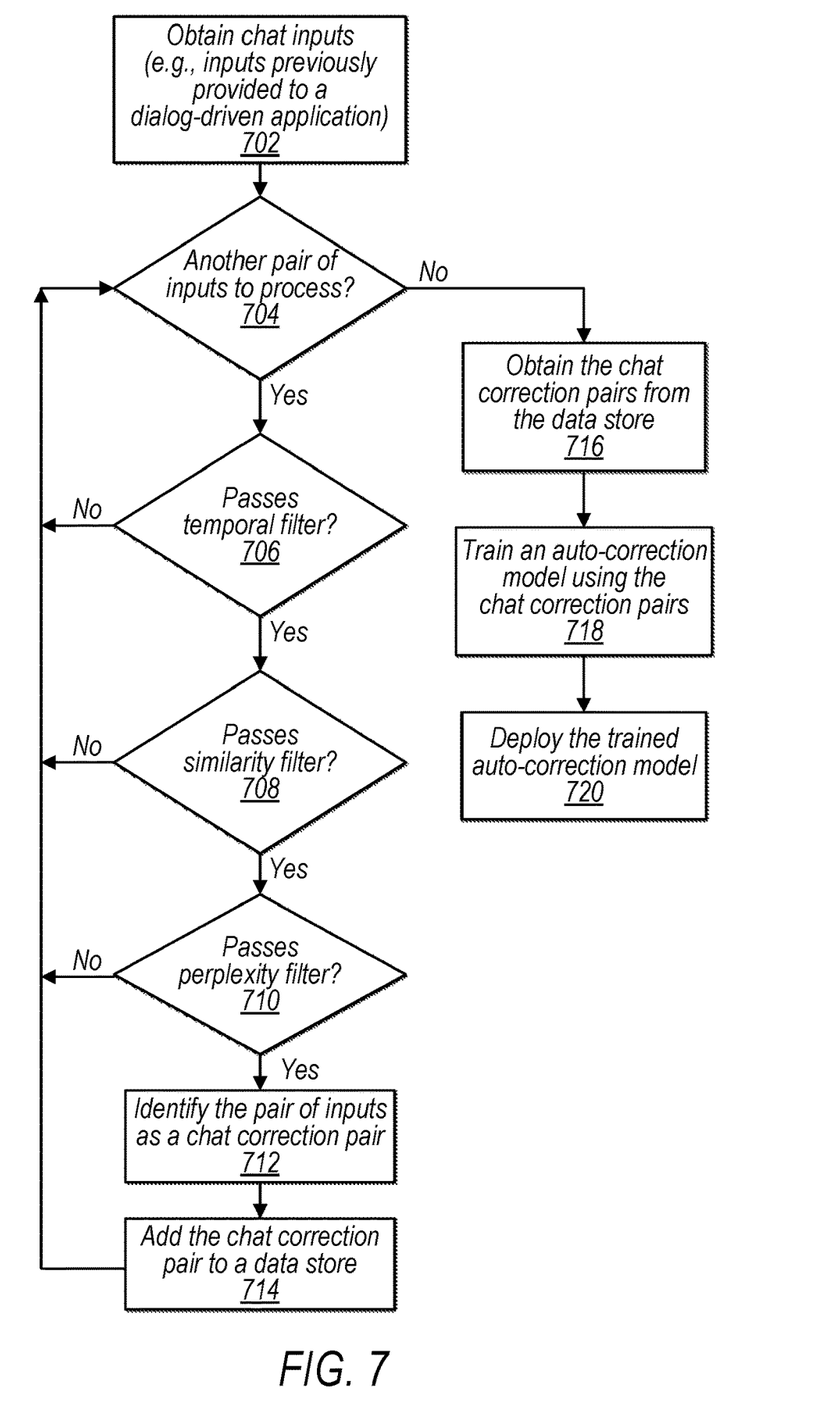
FIG. 7 is a high-level flowchart illustrating various methods and techniques to implement identifying chat correction pairs and sending the chat correction pairs to a model trainer to train an auto-correction model, according to some embodiments.

These techniques, as well as the techniques discussed with regard to FIG. 7, may be implemented using components or systems as described above with regard to FIGS. 1-5, as well as other types of components or systems, and thus the following discussion is not intended to be limiting as to the other types of systems that may implement the described techniques. For example, the techniques may be implemented by computing devices of a client network and/or by a service(s) of a provider network.

At block 602, a computing device(s) (or service) obtains chat inputs (e.g., previously provided to a dialog-driven application). At block 604, the computing device applies filters to the chat inputs to identify chat correction pairs (e.g., temporal, similarity, perplexity). At block 606, the computing device trains an auto-correction model using the identified chat correction pairs. At block 608, the trained auto-correction model deploys the trained auto-correction model. For example, the model may be sent to another destination such as a production system. At block 610, the trained auto-correction model processes a chat input from a user to generate a corrected version of the chat input. At block 612, the computing device provides the corrected version of the chat input to an application for processing.

FIG. 7 is a high-level flowchart illustrating various methods and techniques to implement identifying chat correction pairs and sending the chat correction pairs to a model trainer to train an auto-correction model, according to some embodiments.

At block 702, the chat correction pair identifier obtains chat inputs (e.g., previously provided to a dialog-driven application). At block 704, the chat correction pair identifier determines whether there is another pair of chat inputs to process. If so, then at block 706, the chat correction pair identifier determines whether the pair of chat inputs passes a temporal filter. If not, then the process returns to block 704. If so, then at block 708, the chat correction pair identifier determines whether the pair of chat inputs passes a similarity filter. If not, then the process returns to block 704. If so, then at block 710, the chat correction pair identifier determines whether the pair of chat inputs passes a language perplexity filter. If not, then the process returns to block 704. If so, then at block 712, the chat correction pair identifier identifies the pair of chat inputs as a chat correction pair. At block 714 the chat correction pair identifier adds the chat correction pair to a data store. The process then returns to block 704.

Returning to block 704, if the chat correction pair identifier determines that there is not another pair of chat inputs to process, then at block 716, identifier model trainer obtains the identified chat correction pairs from the data store. At block 718, the model trainer trains the auto-correction model using the obtained char correction pairs. At block 720, the trained auto-correction model is deployed (e.g., to a production environment for use with a dialog-driven application).

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of the chat correction pair identifier, models, trainer, filters, services, and other components that implement the techniques described herein). The various methods as illustrated in the figures and described herein represent example embodiments of methods. The order of any method may be changed, and various elements may be added, reordered, combined, omitted, modified, etc.

Figure 8:
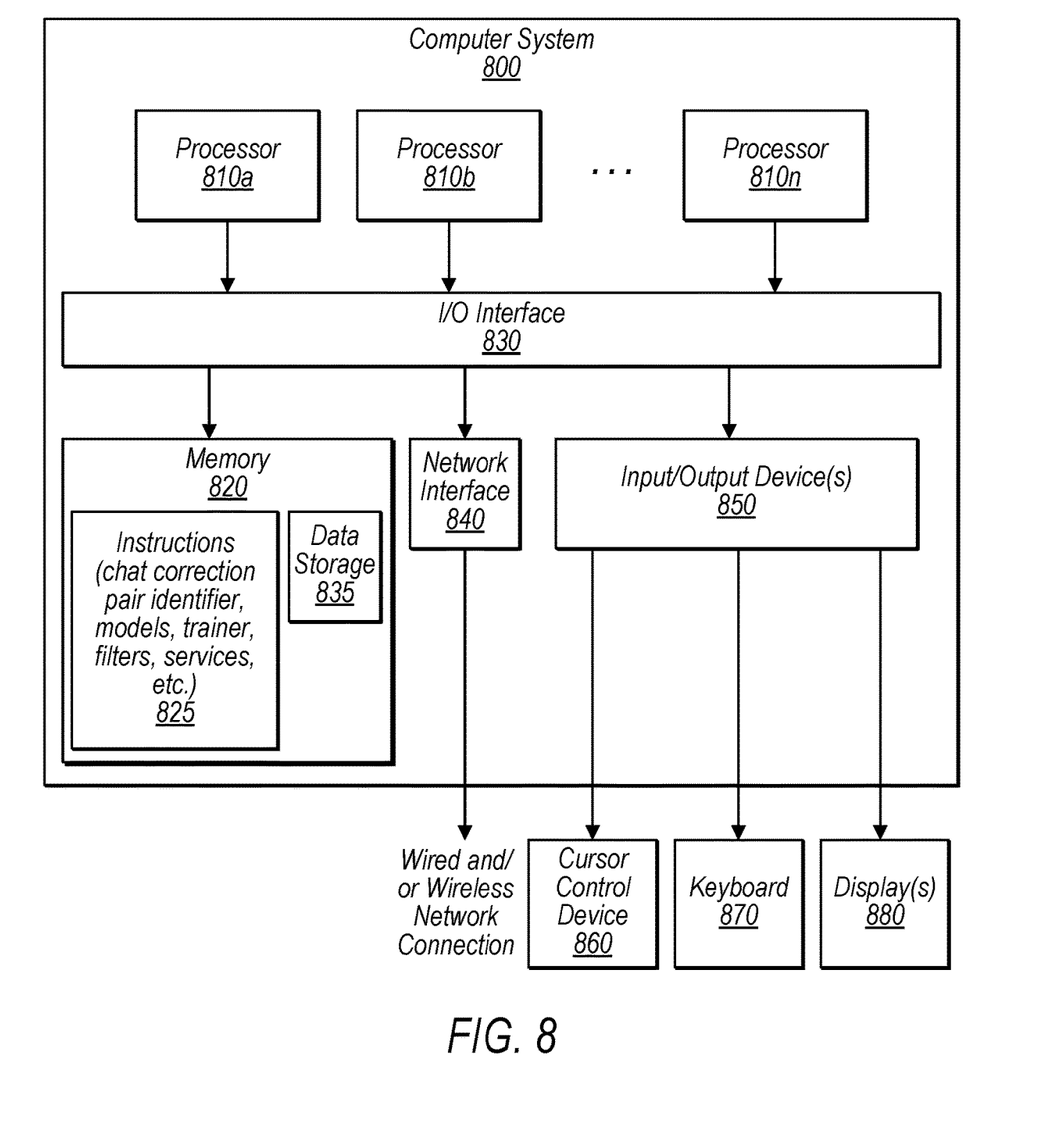
FIG. 8 is a block diagram illustrating an example computing system, according to some embodiments.

Embodiments to implement identifying chat correction pairs for training models to automatically correct chat inputs as described herein may be executed on one or more computer systems, which may interact with various other systems or devices. One such computer system is illustrated by FIG. 8. In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. Display(s) may include standard computer monitor(s) and/or other display systems, technologies or devices, in one embodiment. In some embodiments, it is contemplated that embodiments may be implemented using a single instance of computer system 800, while in other embodiments multiple such systems, or multiple nodes making up computer system 800, may host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions, in one embodiment. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 820 may store program instructions 825 and/or data accessible by processor 810, in one embodiment. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the chat correction pair identifier, models, trainer, filters, services, other components, etc.) are shown stored within system memory 820 as program instructions 825 and data storage 835, respectively. In other embodiments, program instructions and/or data may be received, sent or stored upon different types of computer-accessible media or on similar media separate from system memory 820 or computer system 800. A computer-accessible medium may include non-transitory storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840, in one embodiment.

In one embodiment, I/O interface 830 may be coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may allow data to be exchanged between computer system 800 and other devices attached to a network, such as other computer systems, or between nodes of computer system 800, in one embodiment. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800, in one embodiment. Multiple input/output devices 850 may be present in computer system 800 or may be distributed on various nodes of computer system 800, in one embodiment. In some embodiments, similar input/output devices may be separate from computer system 800 and may interact with one or more nodes of computer system 800 through a wired or wireless connection, such as over network interface 840.

As shown in FIG. 8, memory 820 may include program instructions 825 that implement the various embodiments of the systems as described herein, and data store 835, comprising various data accessible by program instructions 825, in one embodiment. In one embodiment, program instructions 825 may include software elements of embodiments as described herein and as illustrated in the Figures. Data storage 835 may include data that may be used in embodiments (e.g., chat inputs, chat correction pairs, corrected chat inputs, etc.). In other embodiments, other or different software elements and data may be included.

Those skilled in the art will appreciate that computer system 800 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 800 may be transmitted to computer system 800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors; and
   one or more memories, wherein the one or more memories have stored thereon instructions, which when executed by the one or more processors, cause the one or more processors to:
   obtain a plurality of chat inputs that are based on voice or text inputs from one or more users;
   apply a plurality of filters to at least a portion of the plurality of chat inputs to identify a plurality of chat correction pairs that respectively comprise two chat inputs from among the plurality of chat inputs, wherein a given chat correction pair comprises:
      a first chat input that has one or more errors; and
      a second chat input that is a corrected version of the first chat input; and
   subsequent to the identification of the plurality of chat correction pairs that respectively comprise two chat inputs from among the plurality of chat inputs, train an auto-correction model using the plurality of identified chat correction pairs that respectively comprise two chat inputs, wherein the trained auto-correction model is configured to:
      receive an input that is based on voice or text input from a user, wherein the input has one or more errors; and
      process the input to generate a corrected version of the input.

2. The system as recited in claim 1, wherein the first chat input is associated with a first timestamp and the second chat input is associated with a second timestamp, and wherein to apply the plurality of filters to identify the given chat correction pair, the instructions, when executed by the one or more processors, cause the one or more processors to:
   apply a temporal filter to determine that a time indicated by the second timestamp is within a threshold time window of another time indicated by the first timestamp; and
   apply a similarity filter to determine that the second chat input is within a threshold of similarity to the first chat input.

3. The system as recited in claim 2, wherein to identify the given chat correction pair, the instructions, when executed by the one or more processors, further cause the one or more processors to:
   apply a perplexity filter to determine that a language perplexity of the second chat input is lower than a language perplexity of the first chat input.

4. The system as recited in claim 2, wherein to determine that the second chat input is within a threshold of similarity to the first chat input, the instructions, when executed by the one or more processors, further cause the one or more processors to:
   determine that an edit distance of the second chat input is within a predetermined threshold number of characters of the first chat input.

5. The system as recited in claim 1, wherein the input from the user comprises voice input, and wherein the plurality of chat inputs are based on voice inputs from the one or more users.

6. A method, comprising:
   performing, by one or more computing devices:
      identifying one or more chat correction pairs that respectively comprise two chat inputs from among a plurality of chat inputs, wherein a given chat correction pair is based on respective inputs from a given user and comprises:
         a first chat input that has one or more errors; and a second chat input that is a corrected version of the first chat input; and subsequent to the identification of the one or more chat correction pairs that respectively comprise two chat inputs from among the plurality of chat inputs, training an auto-correction model using the one or more identified chat correction pairs that respectively comprise two chat inputs, wherein the auto-correction model is trained to receive another chat input that has one or more errors and process the other chat input to generate a corrected version of the other chat input.

7. The method as recited in claim 6, wherein identifying the one or more chat correction pairs from among the plurality of chat inputs comprises applying a plurality of filters to at least a portion of the plurality of chat inputs, and wherein identifying the given chat correction pair comprises:

applying a temporal filter to determine that a time that corresponds to the second chat input is within a time window of another time that corresponds to the first chat input; and applying one or more other filters to identify the first chat input and the second chat input as the given chat correction pair.

8. The method as recited in claim 7, wherein applying the one or more other filters to identify the first chat input and the second chat input as the given chat correction pair comprises:

applying a similarity filter to determine that the second chat input is within a threshold of similarity to the first chat input.

9. The method as recited in claim 8, wherein determining that the second chat input is within a threshold of similarity to the first chat input comprises:

determining that an edit distance of the second chat input is within a predetermined threshold number of characters of the first chat input.

10. The method as recited in claim 8, wherein applying the one or more other filters to identify the first chat input and the second chat input as the given chat correction pair further comprises:

applying a perplexity filter to determine that a language perplexity of the second chat input is lower than a language perplexity of the first chat input.

11. The method as recited in claim 6, further comprising training the auto-correction model to process an additional chat input from the other user without modifying the additional chat input.

12. The method as recited in claim 6, further comprising training the auto-correction model to assign a confidence level to the corrected version of the other chat input and to provide the corrected version of the other chat input as a result in response to a determination that the confidence level is above a predetermined threshold level.

13. The method as recited in claim 6, wherein a provider network comprises the one or more computing devices, and wherein identifying the one or more chat correction pairs from among the plurality of chat inputs comprises applying a plurality of filters to at least a portion of the plurality of chat inputs, and further comprising:

receiving, from a client, one or more parameter values to configure one or more of the filters.

14. The method as recited in claim 6, wherein a provider network comprises the one or more computing devices, and further comprising making the trained auto-correction model available for use by a dialog-driven application hosted by the provider network on behalf of a client of the provider network.

15. One or more non-transitory computer-accessible storage media storing program instructions that when executed on or across one or more processors cause the one or more processors to:

identify one or more chat correction pairs that respectively comprise two chat inputs from among a plurality of chat inputs, wherein a given chat correction pair is based on respective inputs from a given user and comprises:

a first chat input that has one or more errors; and a second chat input that is a corrected version of the first chat input;

subsequent to the identification of the one or more chat correction pairs that respectively comprise two chat inputs from among the plurality of chat inputs, train, using the one or more identified chat correction pairs that respectively comprise two chat inputs, an auto-correction model to process another chat input to generate a corrected version of the other chat input; and cause the auto-correction model to be available to process additional chat inputs or send the auto-correction model to a destination.

16. The one or more storage media as recited in claim 15, wherein to identify the given chat correction pair, the program instructions when executed on or across the one or more processors further cause the one or more processors to:

apply a temporal filter to determine that a time that corresponds to the second chat input is within a time window of another time that corresponds to the first chat input; and apply one or more other filters to identify the first chat input and the second chat input as the given chat correction pair.

17. The one or more storage media as recited in claim 16, wherein to apply the one or more other filters to identify the first chat input and the second chat input as the given chat correction pair, the program instructions when executed on or across the one or more processors further cause the one or more processors to:

apply a similarity filter to determine that the second chat input is within a threshold of similarity to the first chat input.

18. The one or more storage media as recited in claim 17, wherein to determine that the second chat input is within a threshold of similarity to the first chat input, the program instructions when executed on or across the one or more processors further cause the one or more processors to:

determine that an edit distance of the second chat input is within a predetermined threshold number of characters of the first chat input.

19. The one or more storage media as recited in claim 16, wherein to apply the one or more other filters to identify the first chat input and the second chat input as the given chat correction pair, the program instructions when executed on or across the one or more processors further cause the one or more processors to:

apply a perplexity filter to determine that a language perplexity of the second chat input is lower than a language perplexity of the first chat input.

20. The one or more storage media as recited in claim 16, further comprising program instructions that when executed on or across the one or more processors further cause the one or more processors to:

obtain another plurality of chat inputs;

identify one or more other chat correction pairs from among the other plurality of chat inputs, wherein a given one of the other chat correction pairs is based on respective inputs from another given user and comprises:
　one of the other plurality of chat inputs that has one or more errors; and
　another of the other plurality of chat inputs that is a corrected version of the other chat input;
train the auto-correction model using the one or more other chat correction pairs to generate an updated version of the auto-correction model; and
cause the updated auto-correction model to be available to process subsequently received chat inputs or send the updated auto-correction model to the destination.

* * * * *